Dec. 2, 1958     J. W. DEER ET AL     2,863,014
GRAVITY VERTICAL SENSING SWITCH
Filed Sept. 23, 1957

INVENTORS
James W. Deer
Harley T. Lyman
BY
AGENT

United States Patent Office 2,863,014
Patented Dec. 2, 1958

2,863,014

GRAVITY VERTICAL SENSING SWITCH

James W. Deer and Harley T. Lyman, Portland, Oreg., assignors to Iron Fireman Manufacturing Company, Portland, Oreg., a corporation of Oregon Application September 23, 1957, Serial No. 685,608

10 Claims. (Cl. 200—61.47)

This invention relates generally to electric switches and more particularly to an electric switch sensitive to its position with respect to the gravity vertical at its respective position. In this art the present invention provides a vertical sensing switch to be hung under the rotor case or inner gimbal ring of a gyro vertical coaxially with the spin axis thereof. The switch includes an hermetically sealed metal cup having a drop of mercury resting on the bottom of the cup and free to roll in any direction in response to the tilt of the cup. Electrically connected to the cup a center electrode depends from the top wall of the cup in alignment with the spin axis to a position near the mercury. Equally radially spaced from the center electrode and equally horizontally spaced in quadrature thereabout are four so called stationary contact terminals insulatedly sealed through a wall of the cup to extend into the cup below the elevation of the top of the drop of mercury. A sufficient tilt of the cup in any direction will cause the drop of mercury to connect one or two of the quadrature electrodes to the cup or the center electrode.

The switch is particularly adapted to use under the severe vibration and shock conditions for which it is provided.

The switch also combines four mercury switches as usually used for its purpose into a single pole four throw mercury switch simple in nature and relatively simple and economical to manufacture.

The switch provides a mercury switch for its fourfold purpose having only one drop of mercury and that drop located on the spin axis under the gyroscope case which is the most sensitive position on the case for a gravity controlled drop of mercury.

Other desirable features which the switch provides for the gravity vertical sensing means of the gyro vertical will be seen on reading the following description of the switch and its uses with reference to the attached drawing in which Fig. 1 is a formalized plan view of a gyro vertical of a type with which this invention could be practiced.

Like reference numbers refer to like parts in the several figures of the drawing.

Figure 1:
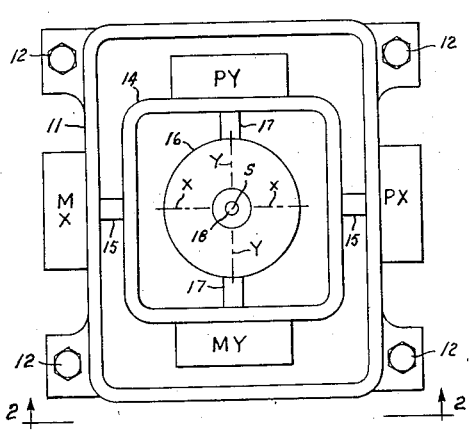
Figure 2:
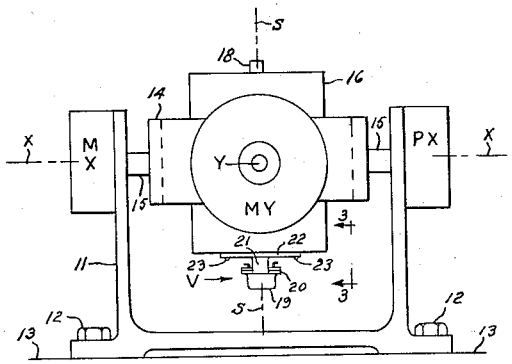
Fig. 2 is a view in side elevation of the gyro vertical of Fig. 1.

Referring now to Fig. 1 and 2 of the drawing a gyroscope frame 11 is shown to be secured by screws 12 to a normally horizontal platform 13 which may be the air frame of a military airplane. Outer gimbal ring 14 secured to axles 15 journalled in frame 11 is thereby supported for free rotation about axis X—X. Case or inner gimbal ring 16 secured to axles 17 journalled in outer gimbal ring 14 is thereby supported for free rotation about axis Y—Y. A wheel and its driving motor, neither shown, secured to axle 18 journalled in case 16, are thereby supported for free rotation about their spin axis S.

Accessory to the gyroscope are torquer motors MX and MY and pick off devices PX and PY. PX is an inductive or potentiometer device for signalling the angular position of outer gimbal ring 14 about the X—X axis with respect to frame 11. PY is an inductive or potentiometer device for signalling the angular position of case 16 about the Y—Y axis with respect to outer gimbal ring 14. Although it is the function of the gyroscope to deliver accurate signals from PX and PY, neither PX nor PY are any part of the present invention. However, assuming that the gyroscope as above described is a so-called gyro vertical having a gravity vertical reference position for the spin axis X—X and that the pick off devices, to function properly, must always indicate the angularity of the platform 13 about axis X—X and Y—Y with respect to the gravity vertical, then the gyroscope can only perform its proper function if the spin axis S—S is maintained in a gravity vertical position.

Because many influences are at work to cause the spin axis to drift away from the gravity vertical there is the continuous necessity for the torquer motors MX and MY to cause the spin axis to return the gravity vertical on its drifts therefrom. Torquer motors MX and MY are continuously split, single phase, capacitor run, induction motors with the two winding wound stators of MX and MY secured respectively to frame 11 and outer gimbal ring 14 while the so-called squirrel cage rotors of motors MX and MY, not shown, are secured respectively to axles 15 and 17 secured respectively to outer gimbal ring 14 and inner gimbal ring or case 16 when the spin axis S—S moves away from the gravity vertical and motors MX and MY are properly energized, they will exert rotating torque in either direction respectively about axis X—X and Y—Y as required to cause the spin axis to precess about axis Y—Y and X—X respectively towards its gravity vertical position.

It is the function of the gravity vertical sensing switch of this invention as here described to sense the direction of drift from gravity vertical of the spin axis S—S and to energize either or both of the torquer motors MX and MY in the proper phase relations to restore the spin axis S—S to its gravity vertical position.

Figure 3:
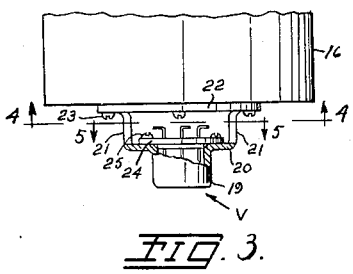
Fig. 3 is a fragmental enlarged view in side elevation as seen from the line 3—3 of Fig. 2.
Figure 4:
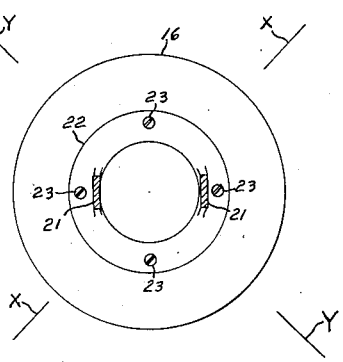
Fig. 4 is a fragmental bottom plan view in partial section along the line 4—4 of Fig. 3.

In Figs. 2, 3, and 4 of the drawing the switch V of this invention is seen to comprise a metal cup 19, formed with a top flange 20, connected by a pair of webs 21, to a supporting ring 22, secured to gyroscope case or inner gimbal ring 16 by screws 23. Terminal supporting insulating cover 24 is hermetically sealed to flange 20 by screws 25.

Figure 5:
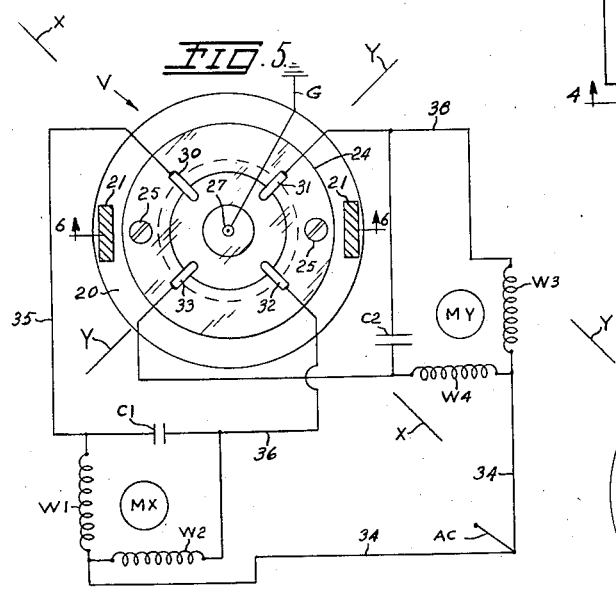
Fig. 5 is a fragmental plan view in partial section as viewed along the line 5—5 of Fig. 3 and including a simplified wiring scheme in which the switch of this invention may be used to advantage.
Figure 6:
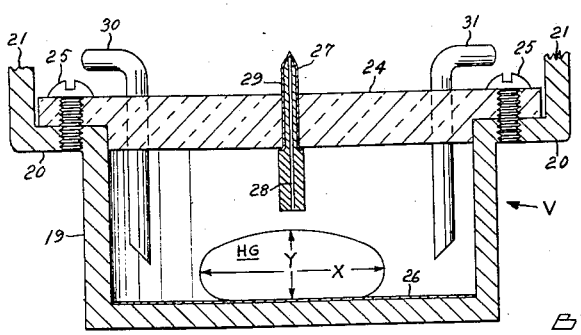
Fig. 6 is an enlarged fragmental view in side sectional elevation as viewed from the line 6—6 of Fig. 5.

In Figs. 5 and 6 sections of the switch V are shown enlarged for clearer treatment of detail and in Fig. 5 a schematic wiring diagram is added to show the functional relation of the switch V to the torquer motors MX and MY.

In Fig. 6 it is seen that a drop of mercury HG rests on the bottom interior of the cup 19 and it should be noted that if the cup 19 is made of a metal not readily wetted by the mercury, like iron, aluminum or platinum, then a layer of such a metal should cover the bottom of the cup as shown at 26. Satisfactory results will be obtained if the entire cup piece 19, 20, 21 and 22 is aluminum. Cover 24 may well be made of glass into and through which are sealed five platinum covered electrodes as shown. Center electrode 27 can be made as desired but is shown to be of metal with a central hole 28 therethrough for proper atmospheric treatment of the interior of cup 19 as is well known in the mercury switch art. The part of electrode 27 sealed to the glass is covered with platinum 29 which is finally burned off at its upper end to close hole 18.

Equally radially spaced from electrode 27 are four platinum electrodes 30, 31, 32 and 33, positioned in angular quadrature about electrode 27 and sealed into and through glass cover 24. Electrodes 30 to 33 are round and beveled to oval shape at their bottom ends as shown. Typical dimensions for the interior of switch V can be given as: The drop of mercury HG will have an X diameter of about .225 inch and a Y height of about .110 inch. The interior diameter of cup 19 will be about one-half inch or a little less. The electrode diameters will be about .032 inch and the electrodes 30 to 33 will be about .032 inch from the inner wall of cup 19. The depth of cup 19 below cover 24 will be about .30 inch and the lower end of center electrode 28 will be about .2 inch above the bottom of cup 19.

In Fig. 5 the schematic electric circuit shows that in the presently described use of our switch V its center electrode 27 and its cup flange 20 are both connected to a so-called ground terminal G of a source of single phase alternating current the other terminal AC of which is connected as shown by wire 34 to one end each of both windings W1, W2 of torquer motor MX and both windings W3, W4 of torquer motor MY. Wire 35 connects the other end of motor winding W1 to one side of motor capacitor C1 and to switch electrode 30. Wire 36 connects the other end of motor winding W2 to the other side of capacitor C1 and to the opposite switch electrode 32. Wire 37 connects the other end of motor winding W4 with one side of motor capacitor C2 and to switch electrode 33. Wire 38 connects the other end of winding W3 with the other side of capacitor C2 and to switch electrode 31.

With the arrangement shown in Fig. 5 should rotor case 16 with its spin axis S—S be tipped from the gravity vertical about the Y—Y axis so that mercury drop HG touches electrode 30, current will flow between source terminals AC and G through torquer motor MX via winding W1 in parallel with the series of winding W2 and capacitor C1 to cause motor MX to exert a turning torque on axle 15 about the X—X axis with respect to frame 11 to cause case 16 to precess about axis Y—Y in the direction to move the spin axis S—S towards its gravity vertical position. In a similar manner when rotor case 16 and spin axis S—S tilt in any direction to cause mercury drop HG to touch any one or two of the switch electrodes 30 to 33 either one or both of the torquer motors MX and MY will be energized in directions to exert torque about their respective axes in their respective directions of rotation to cause the S—S axis to precess towards its gravity vertical position.

In considering the functional beauty of our switch and its disclosed novelty and utility it should be remembered that the previous practice in using mercury switches for the purpose shown has been to use four individual mercury switches each mounted on top of the rotor case 16 to be sensitive to its respective direction of tilt of the spin axis S—S. In such arrangements it has been a persistent problem that the accuracy and sensitivity of response to tilt of the spin axis from gravity vertical is greatly impaired by the presence of high amplitudes of vibration. As far as known by us, of the previous efforts to make a four throw single pole mercury switch for the present purpose, some have performed with reasonable success under conditions of little or no vibration but none have been reliable under condition of high amplitude vibration. Generally three types of failures occurred: 1. Standing waves of mercury were set up due to mercury bouncing off the bottom of the container. Under standing wave conditions, sensitivity to tilt is very poor. Sensitivity is defined as the tendency of the mercury, at small tilts of axis S—S, selectively to contact the electrodes 31 to 34 on the side in the direction of tilt in preference to those on the other side. 2. The mercury bubble was deformed by vibration in such a way that all electrodes were connected to the bubble nearly all the time regardless of the tilt. 3. The mercury bubble was so tossed about that it seldom closed any circuit regardless of tilt.

The above difficulties with previous switches have been substantially avoided in the present switch for under severe vibration it is found that there is never a circuit continuity through the mercury between opposite electrodes like 30—32 or 31—33. Also for a small tilt of the S—S axis such that without vibration the mercury would touch only one of the electrodes 30 to 33, it is found that with vibration the mercury touch the same electrode and no other at least 10% of the time which is sufficient to satisfactorily energize the particular torque motor MX or MY to erect the S—S axis.

Generally speaking it is found desirable to keep the dimensional relations of the switch within the following limits:

(1) The inner diameter of the container to be 1.75 to 2.5 times the X diameter of the mercury drop HG.

(2) The spacing of the center electrode to be 1.1 to 2 times Y, the height of the bubble.

(3) The depth of the container to be at least 2.5 times Y.

(4) The diameter of the electrodes (30 to 33) to be .1 to .2 times X.

(5) The lower ends of electrodes (30 to 33) to be beveled at an angle of 30° to 60° as shown.

(6) The electrodes (30 to 33) may be brought out through the sides of cup 19 rather than through cover 24 provided the lower or beveled end is positioned and formed as shown and properly insulated where it is sealed into the side of the cup.

Having recited some objects or uses to which our invention is particularly adapted, illustrated and described one form in which our invention may be practiced and explained the operation thereof, we claim:

1. A continuous erecting system for a gyro vertical, said gyro vertical comprising a case, a spin rotor journalled in said case freely to rotate about a normally gravity vertical spin axis, an outer gimbal ring in which said case is journalled freely to rotate about a case axis perpendicular to said spin axis and a frame in which said outer gimbal ring is journalled freely to rotate about a frame axis perpendicular to said case axis, said frame being supported on a normally horizontal platform whose divergence from the horizontal is to be indicated by the angular positions of said outer gimbal ring about said case axis with respect to said case and about said frame axis with respect to said frame, said system including a frame torquer electric motor reversable for rotating said outer gimbal ring in either direction about said frame axis with respect to said frame, a case torquer electric motor reversable for rotating said case in either direction about said case axis with respect to said outer gimbal ring, a source of electric power for energizing said motors and a single pole four throw gravity sensing electric switch secured to said case with all throws of said switch open when said spin axis is in its gravity vertical position and with a respective one of said throws of said switch closed when said spin axis is tilted away from its gravity vertical position in the direction of said respective one of said throws of said switch together with circuit means connecting said throws of said switch said motors and said power source to energize at least one of said motors to torque said spin axis towards its gravity vertical position about one of said case axis or said frame axis whenever one of said throws of said switch is closed.

2. For use in selectively connecting the windings of a pair of torquer motors to a source of electric power, said torquer motors being applied to a gyro vertical for erecting the spin axis of said gyro vertical in either direction about either or both of two mutually perpendicular axes other than said spin axis towards the gravity vertical position of said spin axis, a single pole four throw gravity sensing electric switch secured to said case with all throws of said switch open when said spin axis is in its gravity vertical position and with a respective one of said throws of said switch closed when said spin axis is tilted away from its gravity vertical position in the direction of said respective one of said throws of said switch.

3. A single pole plural throw gravity sensing electric switch comprising: an axially vertical cylindrical cup having a metallic bottom with a drop of mercury resting centrally freely thereon, a central electrode extending axially downwardly into said cup towards said mercury drop, and a plurality of independent throw electrodes equally radially spaced from said central electrode and equally angularly spaced therearound, said independent throw electrodes being insulatedly carried on said cup to extend downwardly therein toward the bottom thereof between the side wall thereof and said mercury drop, and said central electrode being connected outside said cup to the metallic bottom thereof to form a common terminal for said switch, whereby said drop of mercury will connect said common terminal with one of said independent throw electrodes whenever the axis of said cup is tilted away from its gravity vertical position in the direction of said one of said independent throw electrodes.

4. The switch of claim 3 in which the inside diameter of said cylindrical cup is from 1.75 to 2.5 times the horizontal diameter of said drop of mercury which the axis of said cup is vertical and said cup is mechanically still.

5. The switch of claim 3 in which the central electrode has a flat horizontal lower end surface spaced above said mercury drop from 1.2 to 2.0 times the vertical height of the mercury drop.

6. The switch of claim 3 in which the inside axial length of the cup is at least 2.5 times the vertical height of the mercury drop.

7. The switch of claim 3 in which the independent throw electrodes are round in cross section with diameters of from .1 to .2 times the horizontal diameter of the mercury drop.

8. The switch of claim 3 in which the lower end surfaces of the independent throw electrodes are beveled downwardly radially inwardly at an angle of between 30° to 60° to the horizontal.

9. An electric circuit including a single phase two terminal source of power, a pair of single phase capacitor run electric motors each having a pair of similar windings spaced ninety electrical degrees apart, a single pole four throw electric switch, a pair of electric capacitors and circuit means connecting one terminal of said source of power to the movable contact of said switch, the other terminal of said source of power to one end respectively of each of said four motor windings, the other ends respectively of each of said motor windings to respective ones of the four stationary contacts of said switch and each of said two respective capacitors between the respective two stationary contacts of said switch connected to the respective other ends of the windings of its respective one of said motors.

10. The electric circuit of claim 9 in which said switch has a normally gravity vertical axial position at which all poles of said switch are open, said stationary contacts are positioned in quadrature about the axis of said switch, the movable contact is gravity sensitive to close on the respective stationary contact toward which said axis is tipped and said motors are adapted when selectively energized by said switch to move said switch to restore the axis of said switch to its normally gravity vertical axial position.

References Cited in the file of this patent
UNITED STATES PATENTS

| | | |
|---|---|---|
| 2,307,441 | Wyman | Jan. 5, 1943 |
| 2,367,465 | Kunzer | Jan. 16, 1945 |
| 2,605,094 | Hancock | July 29, 1952 |